Aug. 4, 1970 R. B. ANDREN 3,523,163

PUSHBUTTON SWITCH FOR USE IN KEYSETS FOR TELEPHONE INSTRUMENTS

Filed Feb. 21, 1968 2 Sheets-Sheet 1

Inventor
R. B. ANDREN
By B. A. Warner
Attorney

United States Patent Office 3,523,163

Patented Aug. 4, 1970

3,523,163

PUSHBUTTON SWITCH FOR USE IN KEYSETS FOR TELEPHONE INSTRUMENTS

Rolf B. Andren, Bandhagen, Sweden, assignor to International Standard Electric Corporation, New York, N.Y., a corporation of Delaware Filed Feb. 21, 1968, Ser. No. 707,153

Claims priority, application Sweden, Mar. 10, 1967, 3,323/67

Int. Cl. H04m *1/23*

U.S. Cl. 179—90 4 Claims

ABSTRACT OF THE DISCLOSURE

A new switch is provided for keysets utilizing printed circuit. The switch includes a helical spring which is actuated by means of a projection on the shaft of a pushbutton so that when the pushbutton is depressed the helical spring will interconnect selected parts of the printed circuit.

Figure 1:
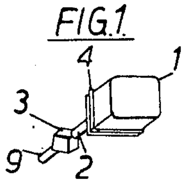

This invention refers to a switch and particularly to a pushbutton switch for use in keysets for telpehone instruments. It is characteristic of the switch of the invention that it is designed as a pushbutton with a non-conductive shaft which has at least one non-conductive projection with a substantially triangular cross section and that said switch is adapted to cooperate with at least one conductive helical spring by the latter being urged against one portion of said projection with the switch in normal position and snapping over said projection and thereby being urged into engagement with electric contacts when said switch is actuated to its operative position.

The switch disclosed by the invention may to advantage be utilized as a pushbutton switch in keysets for telephone instruments, where said switches designed as pushbuttons are provided with flanges at the lower edge of their pushbutton portions for preventing the pushbuttons from being expelled from a plate provided with apertures for said buttons and having a downwardly directed frame engaging the top side of a printed circuit card which is provided with openings corresponding to the pushbutton shafts and the projections thereof, wherein also a printed circuit is positioned on the bottom side of said printed circuit card, and wherein the top sides of said pushbutton flanges are adapted to be forced against the bottom side of said plate by means of compression springs which are positioned between the switch buttons and the circuit card. In accordance with the invention the conductive helical springs cooperating with the switch are positioned on a plate engaging the bottom side of said circuit card, and the projections of the switch shafts are positioned between the helical springs and the printed circuit with the switch in normal position, so that a helical spring is made to engage different portions of the printed circuit and to short circuit these portions when a switch pushbutton is depressed.

Substantial advantages are attained by means of the switch in accordance with the invention, particularly when the same is utilized in keysets for telephone instruments. As may be seen above, the keyboard of the telephone instrument may be divided into two halves with an intermediate printed circuit card, wherein portions of the printed circuit may be connected by one or more switch keys being depressed so that portions of the printed circuit will be short circuited by means of the helical springs disclosed by the invention. It may be of advantage to utilize two helical springs for each contact position, as tests have shown that helical springs make good twin contacts and that the same contact points are never utilized thereon, as said springs will be subject to some rotation when actuated in accordance with the invention. By means of the helical springs the advantage of good cleansing of not only the helical springs but also the printed circuit contacts is attained due to the fact that said helical springs rub against the contacts in different spots upon different occasions. Furthermore, the advantage that no contact adjustment is necessary, neither in assembling nor in operation, is achieved. The switch of the invention provides a very distinct contact function, and the movement when the switch is displaced from normal position to operative position and vice versa will always be completed due to the influence of the mechanical spring forces of the helical spring or helical wire. By positioning the contacts, i.e. the printed circuit, on the bottom side of the printed circuit card it is possible to some extent to prevent the contacts from being subject to impurities, i.e. no dirt etc. can fall down upon the same.

Figure 2:
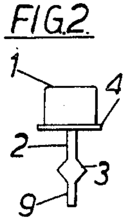
Figure 3:
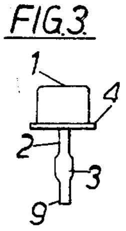
Figure 4:
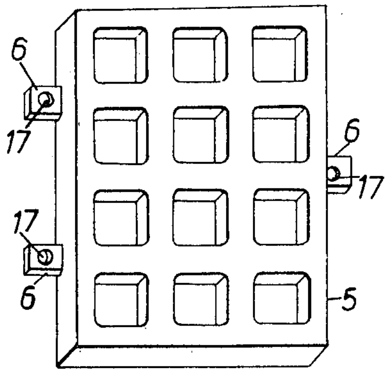
Figure 5:
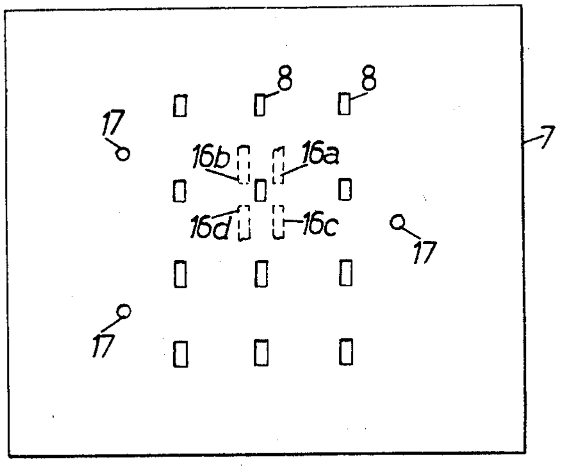
Figure 6:
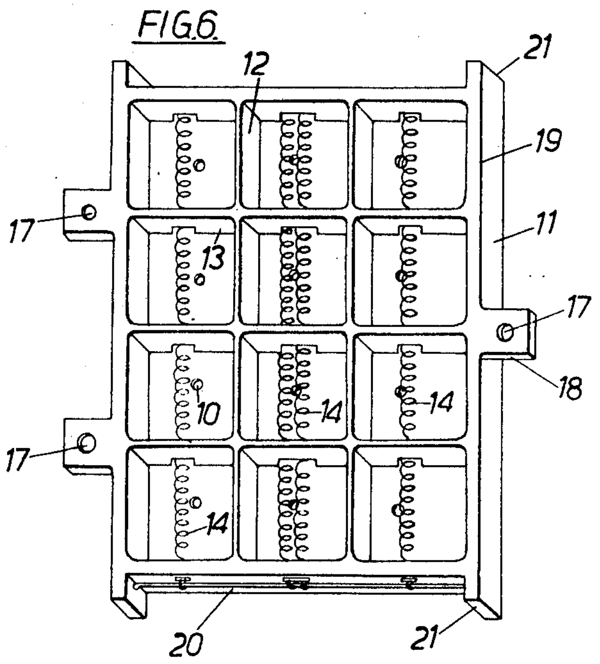
Figure 7:
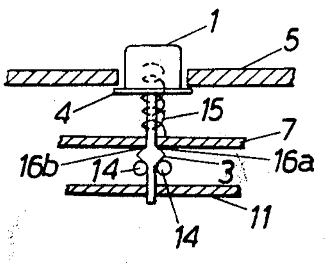
Figure 8:
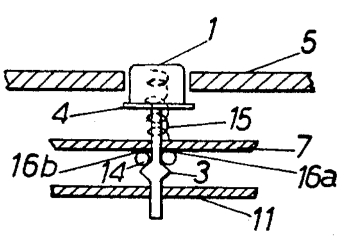

The invention will be described in detail in the following with reference to the accompanying drawings, in which FIG. 1 shows a perspective view of a pushbutton for a switch designed in accordance with the invention, FIG. 2 shows a side view of the pushbuton illustrated by FIG. 1, and FIG. 3 shows a similar side view, which is taken at an angle of 90° as compared to the pushbutton of FIG. 2. FIG. 4 shows a perspective view of the upper portion of a keyboard for a keyset telephone instrument but without any pushbuttons inserted, FIG. 5 shows a plan view of a printed circuit card which is intended for positioning below the keyboard of FIG. 4, FIG. 6 shows—on an enlarged scale as compared to FIG. 4—a perspective view of the lower portion of the keyboard, i.e. the portion that is intended for positioning below the circuit card, wherein the helical springs or helical wires may be seen in said figure, FIG. 7 is a cross section showing a pushbutton positioned in the keyset in normal or quiescent position and FIG. 8 is a similar cross section which shows the pushbutton in depressed position.

The pushbutton of the switch of the invention as illustrated by FIG. 1 consists of the pushbutton head proper with a flange 4 positioned around the lower portion of the same and a shaft 2 attached to said head 1, with said shaft 2 being provided with a projection 3 and continuing in an extension 9. FIGS. 2 and 3 illustrate the shape of said projection 3 more clearly in two directions at right angles to each other. As may be seen from FIG. 3, two of the sides of said projection are mutually parallel. The reason for this will be explained below. The side view illustrated in FIG. 2 shows that the projection 3 has the shape of two isoceles triangles having the same base.

Pushbuttons are intended to be introduced from below into the upper portion 5 of a keyboard, as illustrated in FIG. 4, which may for instance be made of plastic, wherein the upper portions of the flanges 4 of said buttons will be maintained urged against the lower side of said upper portion or unit 5 by means of springs in a manner to be described below. Unit 5 is provided with three tabs 6 for mounting unit 5 to unit 11, with the latter being illustrated in FIG. 6 (which for the sake of clarity is on an enlarged scale as compared to FIG. 4), which will be described below, wherein a circuit card 7 according to FIG. 5 is to lie between the respective units 5 and 11. The three units 5, 7 and 11, respectively, are intended to be mounted together by means of screws (not shown) threaded through apertures 17. The circuit card 7 in accordance with FIG. 5 is provided with substantially rectangular openings or apertures 8 corresponding in number to the pushbutton apertures of FIG. 4, and the projections 3 of the pushbuttons may be introduced through said apertures in a predetermined position, viz, with the parallel sides of said projections lying parallel to the longitudinal sides of the rectangular apertures 8. After the pushbutton shafts 2, 3, 9 have been introduced into the apertures 8 in the circuit card, the pushbuttons 1 may be locked with their projections 3 below circuit card 7 by being turned 90°. On its bottom side circuit card 7 is provided with a printed circuit, of which certain portions are indicated, which are terminated by contacts 16*a*–16*d*. Contacts 16*a* and 16*c*, respectively, and contacts 16*b* and 16*d*, respectively, are intended to be short circuited in a manner to be described below, thereby achieving the results intended by the invention.

When a pushbutton has been introduced into the printed circuit card in the manner described above, the extension 9 of the shaft of the pushbutton switch is introduced into an aperture 10 in the portion 11 of the keyset situated below the printed circuit card 7. The lower portion or unit 11 may for instance comprise a frame 19 of plastic, which is provided with strips 12 and 13, respectively, which also may be of plastic, lying at right angles to each other and being adapted to bear against the lower portion of said circuit card 7 and against the printed circuit, which is so thin that this engagement will not represent any disadvantage. Said strips may be designed in any appropriate manner in each individual case. Helical springs 14 serving as conductive contact closure means extend from approriate fastening means—which are illustrated as insulated wires 20, for instance consisting of nylon, positioned outside of the ends of frame 19 and stretched between flanges 21 on the longitudinal sides of said frame—at one end wall of said unit 11 and through openings in the strips 13 lying at right angles to the direction of said helical springs to fastening means (not illustrated) of a corresponding type at the other end wall, parallel to the longitudinal sides of said unit 11. The conductive helical springs are fixed in their positions by means of said openings in the strips 13. The left and right portions of unit 11 as illustrated in FIG. 6 are each provided with one single helical spring, which is adapted to cooperate with one triangular portion of said projection 3, wherein the corresponding end 9 of said pushbutton shaft will run through one of said holes 10, whereas the intermediate portion of unit 11 is provided with two mutually parallel helical springs 14 that will cooperate with both of the triangular portions of the projections 3 on the respective pushbutton switches that extend through the apertures 10. In this case, unit 11 is also provided with fastening tabs 18 corresponding to the tabs 6 of FIG. 4.

FIG. 7 shows a pushbutton positioned in said keyset in normal position. The same designations have been used in the previous figures, and all that has been added is helical spring 15, which has the function of holding the flange 4 of said pushbutton urged against the upper portion 5 of said keyset in normal position in the manner described above. When the pushbutton and thus the shaft thereof is depressed, projection 3 will separate helical springs 14 more and more, with said springs sliding along the lower edge surface of projection 3 up to the apexes of said projection and thereafter as a result of their spring forces rapidly following the upper edges of said projection 3 and being urged into engagement with the respective corresponding contacts 16*a*, 16*c*, and 16*b*, 16*d*, (compare FIG. 5) while simultaneously short circuiting these contact pairs. This corresponds to the position illustrated in FIG. 8 with the pushbutton entirely depressed. When said button is released, the springs will slide along the upper edges of said projection in the opposite order to that described above and down to the apexes of said projection, whereafter they will follow the two lower edges of the projection back to the position illustrated in FIG. 7.

Due to the strong snap action that occurs when the springs strike the contacts 16, both the contacts and the springs will be cleansed, thereby eliminating any tendency toward the formation of oxides. Furthermore, while moving along projection 3 said springs 14 will be subjected to a rotational movement, and a desired cleansing of said springs will be achieved also in this manner.

The invention is not limited to the embodiment described above and illustrated in the drawings, as this embodiment merely comprises an example of the invention and of its application.

I claim:

1. A pushbutton switch for use in keysets for telephone instruments, comprising a pushbutton (1–4, 9) with a non-conductive shaft (2), said shaft having at least one non-conductive projection (3) of substantially triangular cross section, said switch being adapted to cooperate with at least one conductive helical spring (14) said switch being held against one portion of said projection (3) with the switch in normal position (FIG. 7) and snapping over said projection (3) and thereby being brought into engagement with electric contacts (16*a*, 16*c*) when said switch is actuated to an operative position (FIG. 8).

2. A keyset having a plurality of pushbutton switches in accordance with claim 1, said pushbuttons being provided with flanges (4) at their lower edges for preventing said buttons from being expelled from a plate (5), said plate including apertures for said buttons, said plate having a downwardly directed frame engaging the top side of a printed circuit card (7) provided with openings (8) corresponding to the pushbutton shaft (2, 9) and the projections (3) thereof and said printed circuit being positioned on the bottom side of said printed circuit card, with the top sides of said pushbutton flanges (4) being adapted to be urged against the bottom portion of said plate (5) by means of compression springs (15), said compression springs being positioned between said switch pushbuttons (1) and said circuit card (7), and said helical springs (14) cooperating with the switch are positioned adjacent to a plate (11) to engage the bottom side of said circuit card (7), the projections (3) of the switch shafts (2, 9) are positioned between said helical springs (14) and the printed circuit with the switch in normal position, and a helical spring (14) is urged into engagement with different portions (16*a*, 16*c*) of the printed circuit for interconnecting these portions when a switch pushbutton (1) is depressed.

3. A keyset in accordance with claim 2, characterized in that a conductive helical spring (14) is positioned on each side of said switch shafts (2, 9) and that the projections (3) on said switch shafts (2, 9) are adapted to actuate both of these springs (14) simultaneously, so that different portions (16*a*, 16*c*; 16*b*, 16*d*) of the printed circuit are closed simultaneously.

4. A keyset in accordance with claim 2, wherein said openings (8) for the switch shafts (2, 9) positioned in the circuit card (7) are substantially rectangular, characterized in that the projections (3) of the switch shafts (2, 9) are of such form, that they may be inserted through the circuit card (7) in assembling and may be locked by being rotated 90°, thereby maintaining the projections (3) below the circuit card (7).

No references cited.

KATHLEEN H. CLAFFY, Primary Examiner

T. J. D'AMICO, Assistant Examiner